(12) United States Patent
Kane (10) Patent No.: US 7,225,837 B1
(45) Date of Patent: Jun. 5, 2007

(54) CASING SPACER WITH JOINT RESTRAINT

(75) Inventor: William L. Kane, Somonauk, IL (US)

(73) Assignee: Cascade Waterworks Manufacturing Co., Yorkville, IL (US)

( * ) Notice: Subject to any disclaimer, the term of this patent is extended or adjusted under 35 U.S.C. 154(b) by 0 days.

(21) Appl. No.: 11/514,444

(22) Filed: Sep. 1, 2006

(51) Int. Cl.
*F16L 9/18* (2006.01)

(52) U.S. Cl. .................. 138/112; 138/113; 138/114; 138/108; 285/123.1

(58) Field of Classification Search ............... 138/112, 138/108, 120, 113, 114, 111, 110, 103, 155; 285/123.15, 114, 368, 374, 400, 404, 123.1; 248/68.1
See application file for complete search history.

(56) References Cited

U.S. PATENT DOCUMENTS

| 696,603 | A | * | 4/1902 | Smith ..................... 285/413 |
| 1,098,299 | A | * | 5/1914 | Powell ..................... 285/337 |
| 2,735,449 | A | * | 2/1956 | Grahame ..................... 138/113 |
| 3,700,270 | A | * | 10/1972 | Howard ..................... 285/337 |
| 3,910,610 | A | * | 10/1975 | Turner et al. ............... 285/337 |
| 4,092,036 | A | | 5/1978 | Sato et al. |
| 4,182,378 | A | * | 1/1980 | Dieter ..................... 138/112 |
| 4,492,391 | A | * | 1/1985 | Haines ..................... 285/114 |
| 4,627,774 | A | | 12/1986 | Bradley |
| 4,779,900 | A | | 10/1988 | Shumard |
| 4,896,903 | A | | 1/1990 | Shumard |
| 5,441,082 | A | | 8/1995 | Eskew et al. |
| 5,544,922 | A | | 8/1996 | Shumard et al. |
| 5,592,975 | A | * | 1/1997 | Wissmann et al. .......... 138/112 |
| 5,934,334 | A | * | 8/1999 | Gray et al. .................. 138/112 |
| 6,003,559 | A | * | 12/1999 | Baker ......................... 138/108 |
| 6,158,475 | A | * | 12/2000 | Clemmer .................... 138/112 |
| 6,571,832 | B1 | | 6/2003 | Elliott |
| 6,736,166 | B2 | * | 5/2004 | Calais et al. ................ 138/112 |
| 6,896,004 | B1 | | 5/2005 | Witzel |

* cited by examiner

*Primary Examiner*—James Hook
(74) *Attorney, Agent, or Firm*—Thomas E. Hill; Wildman Harrold Allen & Dixon (57) ABSTRACT

An integrated casing spacer and joint restraint unit is attached to each of a pair of pipe sections adjacent to an end-to-end connection of the pipe sections by means of first and second spacer/retainer ring members. Disposed on the outer periphery of each ring member in a spaced manner are plural risers each having a respective runner disposed on its outer end for engaging an inner surface of an outer casing and maintaining fixed spacing between the inner pipe sections and the outer casing. Plural paired risers, with one riser disposed on each ring member, are aligned with one another along the axis of the connected pipe sections and are each adapted for secure connection to a respective connecting rod for securely coupling the two ring members together and restraining relative movement between the two pipe sections.

14 Claims, 4 Drawing Sheets

CASING SPACER WITH JOINT RESTRAINT

FIELD OF THE INVENTION

This invention relates generally to fluid carrying pipes disposed within an outer casing and is particularly directed to an arrangement for connecting a pair of pipe sections together in a sealed manner while maintaining the connected pipes in fixed position within, and spaced relation from, an outer pipe casing.

BACKGROUND OF THE INVENTION

A pipeline is frequently in the form of an inner liquid carrying pipe disposed within a rigid outer casing. The outer casing isolates the inner pipe from the elements as well as from ground movement and the structural stresses associated therewith. One or more carrier pipes may be disposed within the outer casing, where the inner carrier pipe(s) may be a water or sewer main. An outer casing is frequently positioned about an inner carrier pipe where the carrier pipe crosses a highway or railroad tracks. The outer casing serves to maintain carrier pipe alignment, restrain the carrier pipe against flotation or other movement, and maintain the carrier pipe in fixed position and orientation, such as per grade requirements in the case of a gravity sewer. One or more spacers are typically disposed about the carrier pipe(s) and between the carrier pipe(s) and the outer casing to maintain stationary positioning and fixed spacing of the carrier pipe(s) relative to the outer casing.

Connections between adjacent pipe sections are frequently disposed within an outer casing, particularly where long pipe runs are involved. These pipe connections must also be maintained in fixed position within, and spaced relation from, the outer pipe casing. While the connection between coupled carrier pipes disposed with an outer casing is subject to reduced environmental factors and external forces because of the surrounding outer casing, it is still of critical importance to provide a high strength, secure connection between adjacent pipe sections because of the critical service being provided by the pipeline and because the outer casing makes it more difficult to locate and repair leaks.

Various types of pipe junction holders are available for preventing a pair of joined pipes from becoming disengaged such as when a very large pressure is abruptly applied in the axial direction by a liquid within the pipes. These types of pipe junction holders typically include an annular body having plural through holes each with internal threads. The through holes are aligned radially with the connected pipe sections and bolts inserted into these through holes are tightened so that each bolt engages the outer surface of a pipe section. A push member is frequently disposed between the inner end of the threaded shank of a bolt and the outer peripheral surface of a pipe on which the pipe junction holder is mounted. A roughened, anti-sliding surface may be provided for on an inner portion of the push member so as to frictionally engage the outer surface of the pipe. Tightening of the bolts urges each of the push members into intimate contact with the outer surface of the pipe in connecting the annular body to adjacent ends of the coupled pipes. One example of this type of pipe junction holder is the subject of U.S. Pat. No. 4,092,036, issued on May 30, 1978.

Installing a pipe junction holder connecting in an end-to-end manner carrier pipes in an outer casing is difficult, time consuming and can result in breakage or damage to the sealed pipe connection. Moreover, casing spacers are located intermediate the pipe joint connections and thus do not provide optimal support for the heaviest portions of the carrier pipe network where adjacent carrier pipe sections are connected together. In addition, the reduced support available at the pipe junction holders also destabilizes these connections and renders them more susceptible to leakage caused by vibration and movement as well as from sudden increases in pressure imparted in the axial direction to the internal surface of the joined pipes. This less than optimal support for the pipe connections results in a higher rate of joint failure and leakage which requires removal of both pipe sections and the pipe joint connection from the outer casing for repair with great difficulty and substantial expense.

To date, there is no known pipe coupling arrangement which is also capable of maintaining the connected pipes in fixed position within, and spaced relation from, an outer casing enclosing the connected pipes. The present invention addresses this situation by providing a casing spacer for a pair of joined pipes disposed within an outer casing which also provides a joint restraint for maintaining a sealed connection between the pipes.

OBJECTS AND SUMMARY OF THE INVENTION

Accordingly, one of the objects of the present invention is to provide an arrangement for securely connecting a pair of carrier pipes in a manner which eliminates, or substantially reduces, the above discussed problems encountered in the prior art and is particularly adapted for use in an outer casing for maintaining proper positioning of the joined carrier pipes within the outer casing Accordingly, it is an object of the present invention to provide improved support and fixed positioning for a pair of joined pipes disposed in an outer casing as well as joint restraint for maintaining secure connection between the pipes.

It is yet another object of the present invention to provide a casing spacer arrangement for first and second joined pipes disposed within an outer casing which also holds the two pipes together in a secure, sealed connection.

A further object of the present invention is to provide a pipe coupling arrangement for connecting first and second pipe sections which also serves to maintain the pipe sections and their connection in fixed, spaced relation from an outer casing disposed about the two pipes.

Another object of the present invention is to provide for the accurate and secure positioning of a pair of end-to-end connected carrier pipes within an outer casing involving the expenditure of substantially reduced time, work and cost than present approaches.

Still another object of the present invention is to provide a unitary connecting and concentric spacing arrangement for a pair of carrier pipes disposed within an outer casing.

Still another object of the present invention is to provide for the assembly and connection of a pair of carrier pipes and the secure and fixed positioning of the connected carrier pipes on the inner portion of an outer casing spacer by a single worker without special tools.

This invention contemplates an arrangement for use with first and second connected pipe sections disposed within an outer casing, with the arrangement comprising: first and second segmented bands; first couplings each connected to respective adjacent ends of each segment of the first and second segmented bands for maintaining the first and second segmented bands disposed about and engaging the first and second pipe sections, respectively, in a tight-fitting manner; plural risers disposed in a spaced manner on an outer portion of the first and second segmented bands for maintaining the first and second pipe sections in fixed position within, and in spaced relation from, the outer casing; and second couplings connecting aligned risers disposed on the first and second segmented bands for maintaining connection between the first and second pipe sections.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
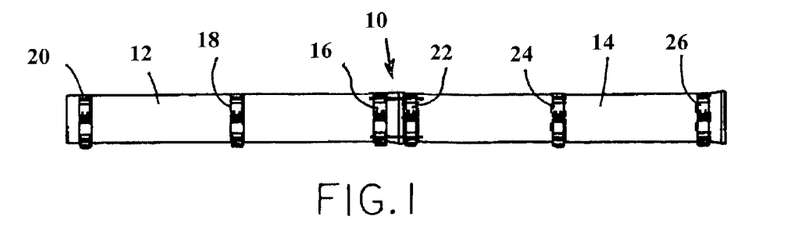
FIG. 1 is a side elevation view of a pair of connected pipe sections upon which are disposed plural spaced casing spacers, including two casing spacers disposed on opposed sides of the joint between the two pipe sections which maintain the two pipes in fixed position within, and in spaced relation from, an outer casing and also serve as a joint restraint in accordance with the present invention.
Figure 2:
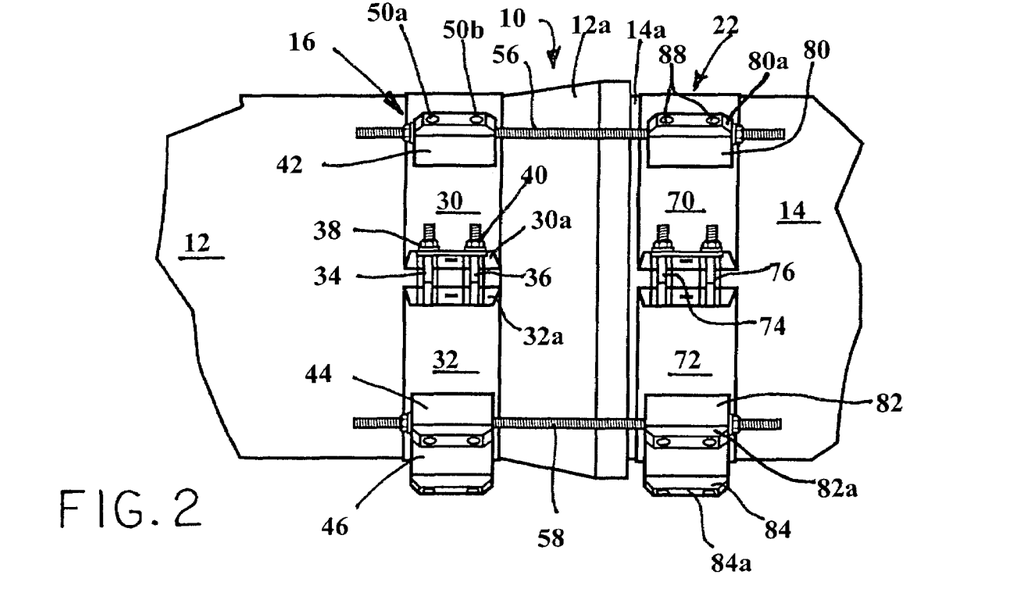
FIG. 2 is a side elevation view illustrating additional details of the casing spacer with joint restraint arrangement of the present invention for use with a pair of joined pipes disposed within an outer casing.
Figure 3:
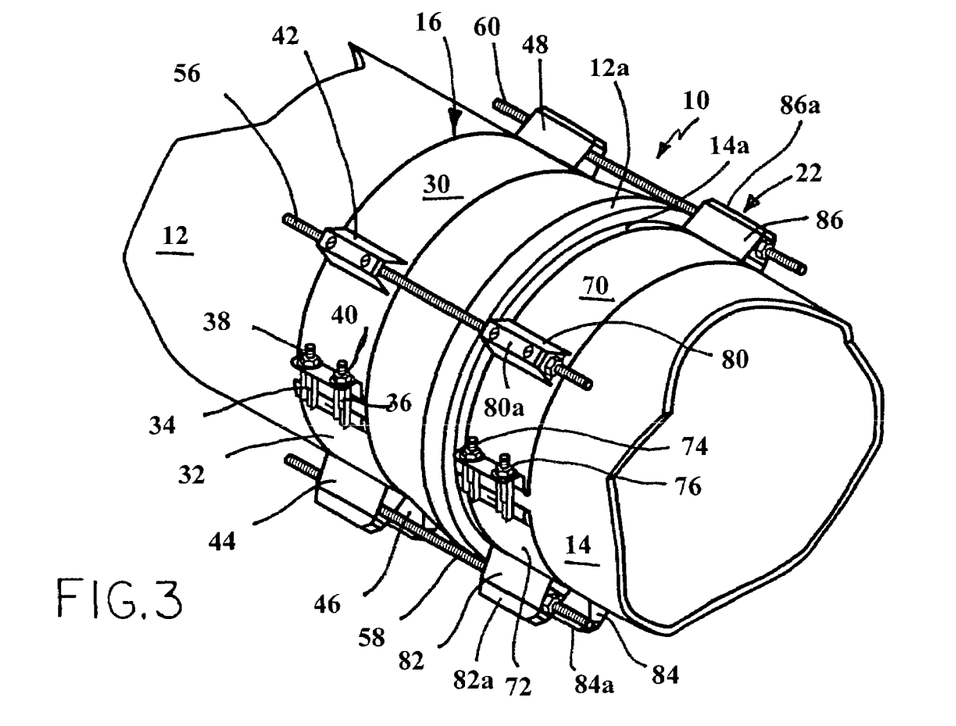
FIG. 3 is a perspective view of the casing spacer with joint restraint arrangement of the present invention shown in use with a pair of joined pipes.
Figure 4:
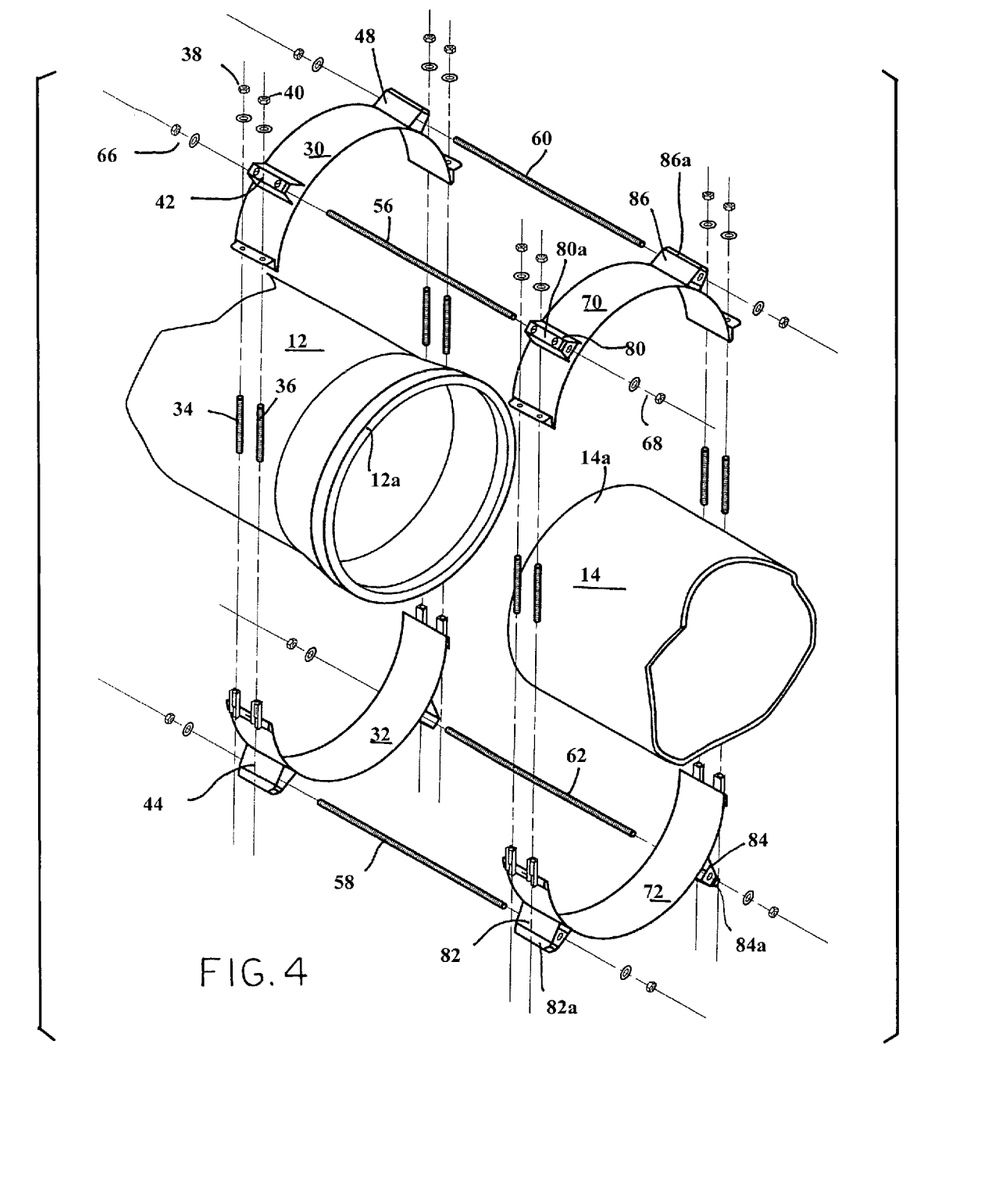
FIG. 4 is an exploded perspective view of a casing spacer with joint restraint in accordance with the present invention.
Figure 5:
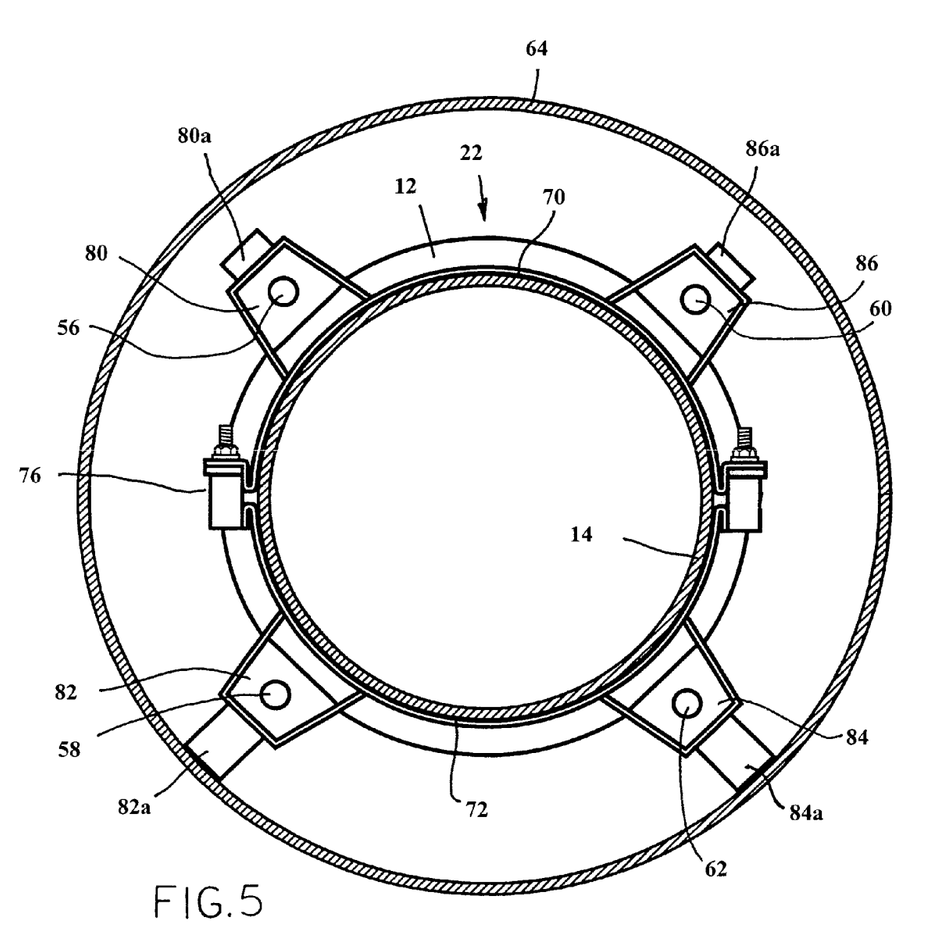
FIG. 5 is a transverse sectional view of a pair of joined pipe sections incorporating the casing spacer with joint restraint arrangement of the present invention.

Referring to FIG. 1, there is shown a side elevation view of first and second coupled pipe sections 12 and 14 incorporating a casing spacer with joint restraint arrangement 10 in accordance with the present invention. FIGS. 2 and 3 are respectively side elevation and perspective views showing additional details of the casing spacer with joint restraint arrangement 10 of the present invention, while FIG. 4 is an exploded perspective view of the inventive casing spacer with joint restraint. FIG. 5 is a transverse sectional view of the casing spacer with joint restraint arrangement 10 of the present invention for connecting first and second pipes disposed within an outer casing 64 and for maintaining the two pipe sections in fixed position within, and in spaced relation from, the outer casing.

The casing spacer with joint restraint arrangement 10 of the present invention is adapted for attachment to the first and second pipe sections 12 and 14 which are joined together at their adjacent ends. As shown in FIG. 1, there are first, second and third casing spacers 16, 18 and 20 disposed on the outer surface of the first pipe section 12 in a spaced manner. Similarly, fourth, fifth and sixth casing spacers 22, 24 and 26 are disposed in a spaced manner along the length of the second pipe section 14. It is the first and fourth casing spacers 16, 22 which form the casing spacer with joint restraint arrangement 10 of the present invention.

The first casing spacer 16 is comprised of first and second band segments 30 and 32 which are disposed about and in contact with the outer surface of the first pipe section 12. Similarly, the fourth casing spacer 22 is comprised of third and fourth band segments 70 and 72 disposed on and engaging the outer surface of the second pipe section 14. As shown in FIG. 2, the coupling between adjacent ends of the first and second pipe sections 12, 14 includes an annular flange 12a disposed on the end of the first section such as in the form of a bell end. The adjacent end of the second pipe section 14 is adapted to fit within the first pipe section's annular flange 12a in a tight fitting manner. A sealing member is typically inserted within this annular flange 12a and between the adjacent ends of the two pipe sections to form a watertight seal. This sealing member, which is not shown in the figures for simplicity, typically takes the form of an annular gasket, or seal.

Disposed on adjacent ends of the first and second band segments 30, 32 are respective coupling flanges 30a and 32a. Securely attached to coupling flange 32a, such as by weldments, are first and second threaded shafts 34 and 36. Disposed within coupling flange 30a are first and second apertures, each adapted to receive a respective one of the first and second threaded shafts 34, 36. With the first threaded shaft 34 inserted in a first aperture within coupling flange 30a and the second threaded shaft 36 inserted in a second aperture in the coupling flange, a first nut 38 is threadably positioned on the first threaded shaft and a second nut 40 is threadably positioned on the second threaded shaft for securely connecting adjacent ends of the first and second band segments 30, 32. Similarly, respective coupling flanges are disposed on adjacent ends of each of the third and fourth band segments 70 and 72 and are securely coupled together by means of third and fourth nut/threaded shaft combinations 74 and 76. Similar combinations of coupling flanges and nut/threaded shaft combinations are disposed on second, opposed ends of each of the first and second band segments 30, 34 and the third and fourth band segments 70, 72 for securely attaching the second, opposed ends of adjacent band segments as shown in the sectional view of FIG. 5. Although the present invention is described primarily in terms of first and second band segments comprising each casing spacer, casing spacers of the present invention may be comprised of additional band segments depending upon the outer diameter of the connected pipes. Larger diameter pipes would typically require additional band segments forming each of the casing spacers. The present invention contemplates virtually any number of individual band segments comprising each of the casing spacers depending upon pipe outer diameter and the application in which the casing spacers with joint restraint of the present invention are utilized.

Disposed about each of the casing spacers in a spaced manner are plural risers. Thus, positioned on the outer surface of the first casing spacer 16 are first, second, third and fourth risers 42, 44, 46 and 48. Similarly, attached in a spaced manner to the outer surface of the fourth casing spacer 22 are fifth, sixth, seventh and eighth risers 80, 82, 84 and 86. Additional risers may also be positioned on the outer surfaces of each of the first and fourth casing spacers 16, 22 to maintain proper spacing between the first and second pipe sections 12, 14 and an outer casing, as the outer end portion of at least some of the risers engage the inner surface of the outer casing as discussed below.

Each of the above described risers and each of the above described band segments are preferably comprised of a high strength metal such as stainless steel. Each of the aforementioned risers is connected to its associated band segment by conventional means such as weldments. Disposed on the distal, or outer, end of each of the risers is an associated runner. Thus, in the fourth casing spacer 22 runners 80a, 82a, 84a and 86a are respectively disposed on distal ends of the fifth, sixth, seventh, and eighth risers 80, 82, 84 and 86. The distal end of each of the fifth, sixth, seventh, and eighth risers 80, 82, 84 and 86 are provided with a pair of spaced threaded apertures adapted to receive a pair of threaded pins 88 as shown in FIG. 2 for the case of the fifth riser 80. Threaded pins 88 perform a first function in terms of maintaining runner 88 securely on the distal end of riser 80, and also engage the first connecting rod 56 inserted through the fifth riser 80 as well as through the first riser 42 on the first casing spacer 16. The first riser 42 is similarly provided with a first and second threaded pins 50a and 50b for also securely engaging the first connecting pin 56. By securely attaching the first connecting pin 56 to the first and fifth risers 42, 80, relative motion between the first and fourth casing spacers 16, 22 is prevented and the first and second pipe sections 12, 14 are maintained in fixed, sealed connection. Each of the remaining risers is provided with a corresponding pair of threaded apertures and threaded pins for engaging a connecting rod inserted through aligned risers on the first and fourth casing spacers for connecting the first and second pipe sections 12, 14 together in a fixed manner and restraining relative movement between these two pipe sections. Each of connecting rods 56, 58, 60 and 62 is provided with threads on its outer surface extending the length of the rod. Each of these connecting rods is adapted to receive a nut and washer combination on each of its opposed ends as shown for the case of the first connecting rod 56 and first and second nut and washer combinations 66 and 68 disposed on opposed ends of the connecting rod. The first and second nut and washer combinations 66 and 68 respectively engage the first and fifth risers 42 and 80 and also ensure the secure and fixed coupling of the first connecting rod 56 to these two risers. Similar nut and washer combinations are also attached to opposed ends of the remaining connecting rods for maintaining them in position on associated pairs of risers.

Each of the semi-circular shell members 30, 32 and 70, 72, as well as the risers attached thereto, is preferably comprised of stainless steel, or painted or galvanized plated or epoxy coated steel. Each of the runners attached to a distal end of a riser is preferably comprised of a rigid, strong material for supporting and positioning the casing spacer and carrier pipe within the outer casing and further preferably have a relatively low coefficient of friction to facilitate sliding displacement of the casing spacer within the outer casing to facilitate installation and positioning of the casing spacer. This permits the casing spacer to be installed without special tools or lubricants. In a preferred embodiment, the runners are comprised of a plastic such as UHMW polymer. The outer casing is typically comprised of a high-strength steel, but may also be comprised of iron, concrete, fiberglass, plastic or other materials. The described carrier pipes may be comprised of steel, stainless steel, iron, concrete, fiberglass, asbestos/cement, plastic, or a combination of these and other materials.

Figure 6:
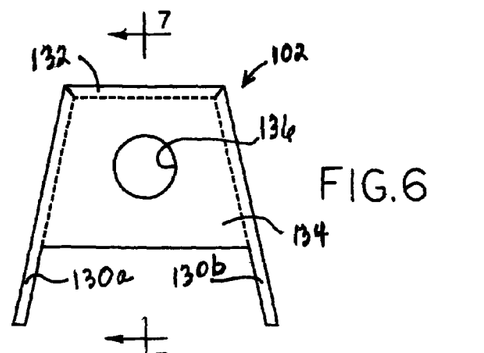
FIG. 6 is a front elevation view shown partially in phantom of a riser used in the casing spacer with joint restraint of the present invention.
Figures 6, 7, 8:
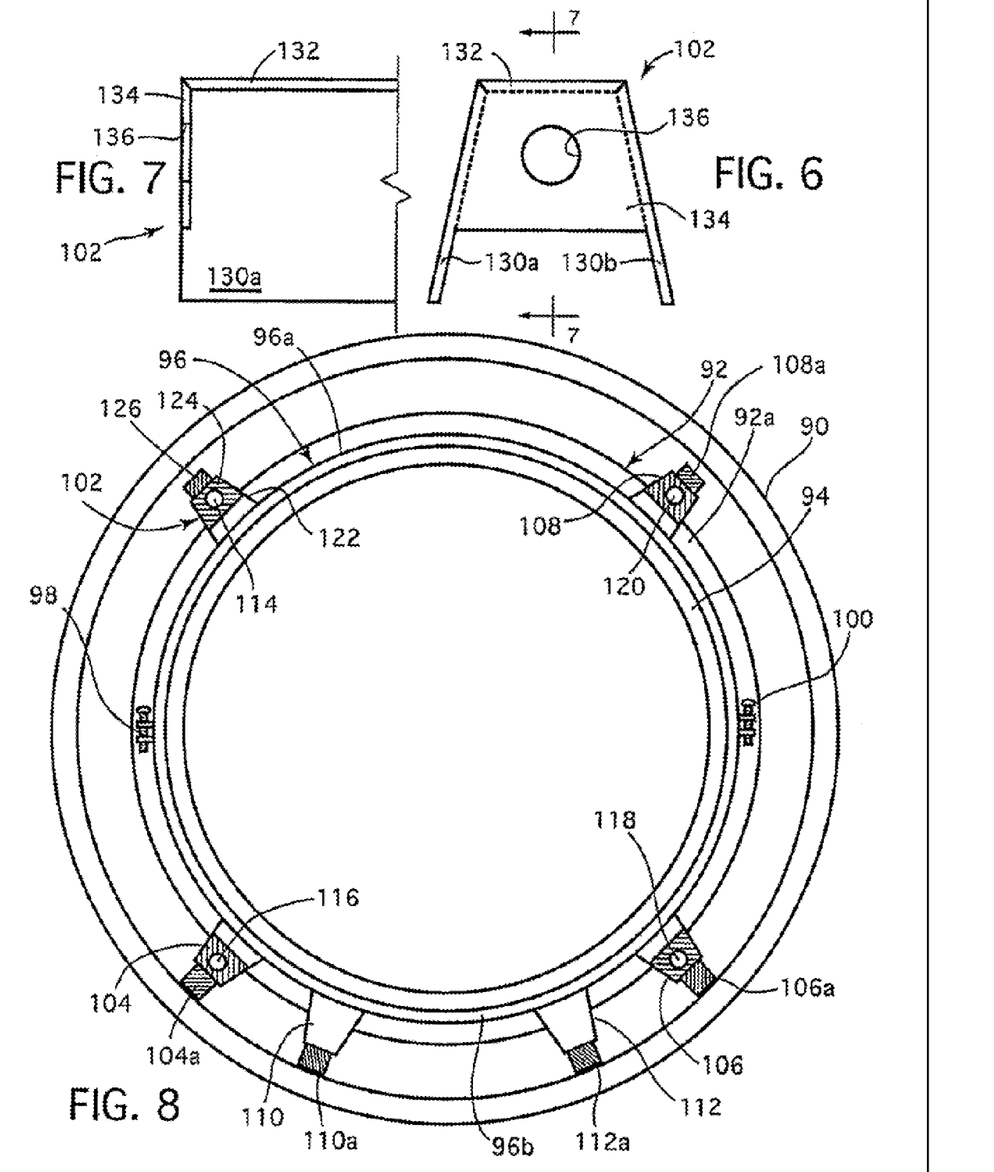
FIG. 7 is a sectional view of the riser shown in FIG. 6 taken along sight line 7-7 therein.
FIG. 8 is a transverse view of a pair of joined pipe sections incorporating another embodiment of a casing spacer with joint restraint in accordance with the present invention.
Figure 7:
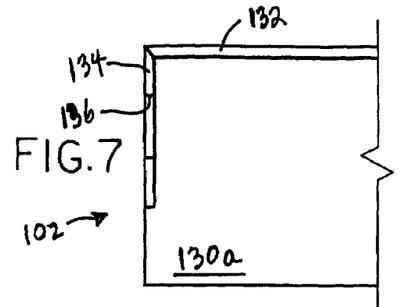
Figure 8:
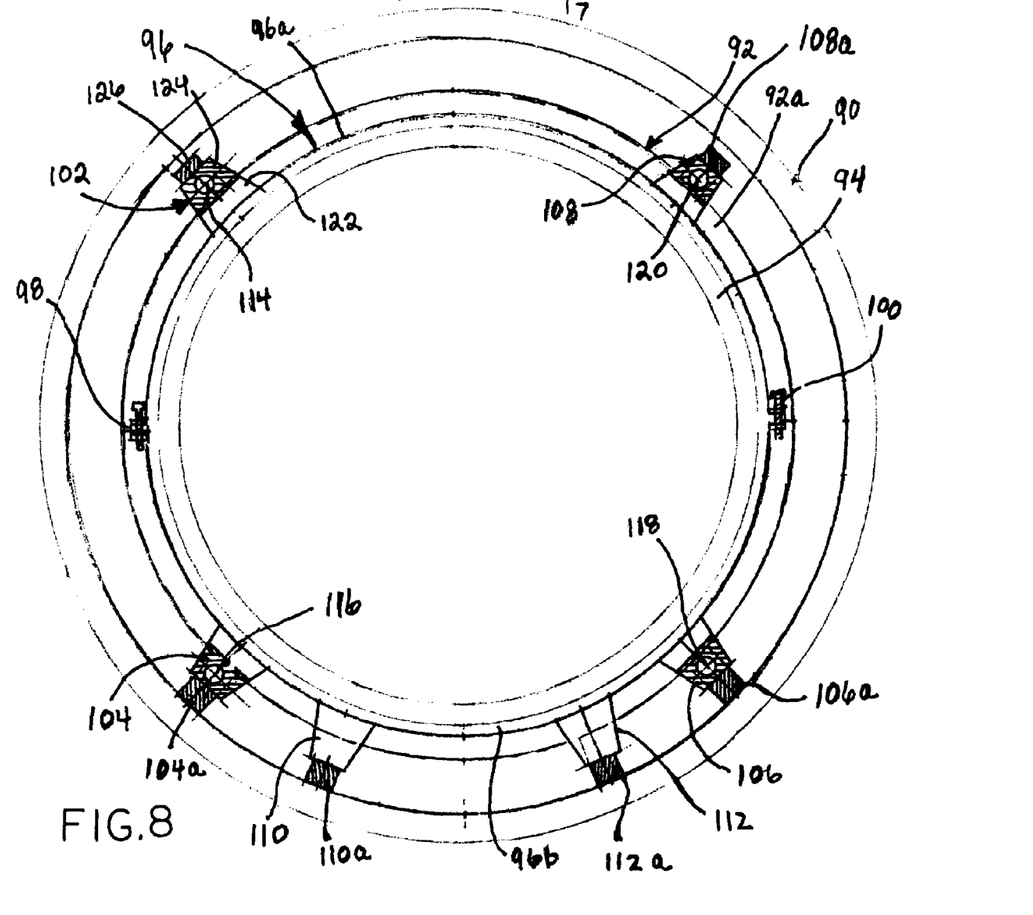

Shown in FIG. 8 is another embodiment of a casing spacer with joint restraint 96 in accordance with the present invention. As shown in the transverse sectional view of FIG. 8, each of plural risers 102, 104, 106 and 108 is formed integrally with, or securely attached to, an outer surface of a band segment of casing spacer 96. A pair of joined third and fourth pipe sections 92 and 94 are shown disposed within an outer casing 90. In the pipe arrangement shown in FIG. 8, the fourth pipe section 94 is inserted in an enlarged end flange portion 92a of the third pipe section 92. Disposed about and engaging the outer surface of the fourth pipe section 94 is casing spacer 96 which is comprised of first and second band segments 96a and 96b. The aforementioned risers 102 and 108 are attached to the outer surface of the casing spacer's first band segment 96a, while risers 104 and 106 are attached to the outer surface of the casing spacer's second band segment 96b. Adjacent ends of the first and second band segments 96a, 96b are securely connected together by means of first and second nut/threaded shaft combinations 98 and 100, as previously described. Additional risers 110 and 112 are shown in FIG. 8 as engaging a lower inner portion of the outer casing 90. These latter risers 110, 112 are also attached to casing spacer 96. As shown in FIG. 4, the lower risers engage a lower inner portion of the outer casing 90 and provide support for the third and fourth pipe sections 92 and 94. The two upper risers 102 and 108 are maintained in spaced relation from an upper inner portion of the outer casing 90 to facilitate insertion of the pipe sections within the outer casing. In a preferred embodiment, the spacing between these upper risers 102 and 108 and the inner surface of casing 90 for a casing having an inner diameter of 40.75 inches with a carrier pipe having a 32 inch outer diameter is 0.68 inch.

The structure of each of the risers will now be described with respect to the first riser 102 as all of the risers have essentially the same structure. The first riser 102 is shown in greater detail in the front elevation view of FIG. 6 and the sectional view of FIG. 7 taken along sight line 7-7 in FIG. 6. The first riser 102 includes a tapered, generally U-shaped base 122 which is securely attached to the outer surface of the first band segment 96a of casing spacer 96, such as by weldments. Formed integrally with, or securely attached to, one end of the riser's base 122, such as by weldments, is an apertured end plate 124. In a preferred embodiment, riser 102 is formed of first and second side plates 130a and 130b, a top plate 132 and a front plate 134 having an aperture 136 within which a connecting rod is inserted. All of the plates are preferably flat, comprised of a high strength metal, and are coupled together by conventional means such as weldments. Disposed within the aperture in end plate 124 is a connecting rod 114, as described above. Additional connecting rods 116, 118 and 120 are respectively disposed in the remaining risers 104, 106 and 108. Formed integrally with, or attached to, a distal end of the riser's base 122 such as by means of weldments is a runner 126 which is adapted to engage an inner surface of the outer casing 90. Disposed within runner 126 are a pair of threaded apertures (not shown in FIG. 4 but discussed above), each adapted to receive a threaded connector which engages the first connecting rod 114 and maintains the connecting rod fixedly in position within the riser 102. The secure connection between each of the connecting rods and its associated riser ensures a secure coupling between the third and fourth pipe sections 92, 94 and provides a joint restraint for the two connected pipe sections. This joint restraint prevents axial movement between the third and fourth pipe sections 92, 94 in accordance with the present invention.

While particular embodiments of the present invention have been shown and described, it will be obvious to those skilled in the relevant arts that changes and modifications may be made without departing from the invention in its broader aspects. For example, each riser may be formed integrally with its associated casing spacer segment band such as where the casing spacers are comprised of a high strength, pliable plastic material. Or, where the casing spacers are comprised of a high strength metal, such as steel, the risers may be securely attached to the casing spacer's segment band by conventional means such as weldments. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use with first and second connected pipe sections disposed within an outer casing, an arrangement comprising:
   first and second segmented bands;
   first couplings each connected to respective adjacent ends of each segment of said first and second segmented bands for maintaining said first and second segmented bands disposed about and engaging said first and second pipe sections, respectively, in a tight-fitting manner;
   plural risers disposed in a spaced manner on an outer portion of said first and second segmented bands for maintaining the first and second pipe sections in fixed position within, and in spaced relation from, said outer casing, wherein each of said risers is comprised of a unitary structure including first and second flat side plates each having respective opposed proximal and distal edges, a flat top plate, and a flat end plate having an aperture therein, wherein said flat top plate is connected to aligned distal edges of said first and second side plates and said end plate is connected to adjacent edges of said first and second side plates and said top plate to form a generally U-shaped base, and wherein said side, top and end plates are connected together by first weldments;
   second weldments attaching the proximal edges of the first and second side plates of each of said risers to a segmented band so as to form each of said risers integrally with an associated segmented band; and
   second couplings connecting aligned risers on said first and second segmented bands for maintaining connection between the first and second pipe sections, wherein said second couplings include plural connecting rods each inserted through the end plate apertures in a pair of aligned risers and having first and second opposed threaded ends, and wherein said second couplings further include plural threaded nuts each disposed on an end of a connecting rod for maintaining each connecting rod securely attached to the aligned pair of risers on said first and second segmented bands.

2. The arrangement of claim 1 wherein said second couplings further include one or more connecting pins attached to each of said risers for engaging a connecting rod attached to the riser and securely attaching the connecting rod to the riser.

3. The arrangement of claim 1 further comprising a runner disposed on an outer end of each riser for facilitating sliding movement of the first and second connected pipe sections within the outer casing during installation and positioning of the first and second connected pipe sections within the casing.

4. The arrangement of claim 3 wherein the height of each runner extending radially outward from a longitudinal axis of the first and second connected pipe sections is selected to facilitate installation in and removal from the outer casing of the connected pipe sections.

5. The arrangement of claim 3 wherein each runner is attached to a respective riser by means of threaded connecting pins.

6. The arrangement of claim 5 wherein each runner includes plural third apertures each aligned with a respective threaded second aperture of the riser for receiving a respective threaded connecting pin and attaching the runner to the riser.

7. The arrangement of claim 6 wherein said segmented bands, risers and connecting rods are comprised of a high strength metal.

8. The arrangement of claim 7 wherein said high strength metal is stainless steel, painted or galvanized plated steel, or epoxy coated steel.

9. The arrangement of claim 3 wherein each of said runners is comprised of a material having a low coefficient of friction.

10. The arrangement of claim 9 wherein each of said runners is comprised of a plastic such as UHMW polymer.

11. The arrangement of claim 1 wherein each of said first and second bands includes a pair of connected semi-circular segments.

12. The arrangement of claim 11 further comprising third couplings connecting adjacent ends of a pair of semi-circular segments disposed about a pipe section.

13. The arrangement of claim 1 wherein said plural connecting rods are axially aligned with the connected pipe sections and are disposed about said first and second pipe sections in a spaced manner.

14. The arrangement of claim 13 wherein said plural connecting rods are symmetrically disposed about a longitudinal axis of the first and second pipe sections.

* * * * *

UNITED STATES PATENT AND TRADEMARK OFFICE
CERTIFICATE OF CORRECTION

| | | |
|---|---|---|
| PATENT NO. | : 7,225,837 B1 | Page 1 of 2 |
| APPLICATION NO. | :11/514444 | |
| DATED | : June 5, 2007 | |
| INVENTOR(S) | : William L. Kane | |

It is certified that error appears in the above-identified patent and that said Letters Patent is hereby corrected as shown below:

Please replace informal Sheet 4 containing FIGS. 6, 7, and 8 with the formal drawing Sheet 4 containing FIGS. 6, 7, and 8. (attached)

Signed and Sealed this

Sixth Day of November, 2007

JON W. DUDAS
*Director of the United States Patent and Trademark Office*